United States Patent
Grigorev et al.

(10) Patent No.: US 12,361,662 B2
(45) Date of Patent: Jul. 15, 2025

(54) POINT-BASED MODELING OF HUMAN CLOTHING

(71) Applicant: SAMSUNG ELECTRONICS CO., LTD., Suwon-si (KR)

(72) Inventors: Artur Andreevich Grigorev, Moscow (RU); Victor Sergeevich Lempitsky, Yerevan (AM); Ilya Dmitrievich Zakharkin, Moscow (RU); Kirill Yevgenevich Mazur, London (GB)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 274 days.

(21) Appl. No.: 18/086,328

(22) Filed: Dec. 21, 2022

(65) Prior Publication Data

US 2023/0126829 A1 Apr. 27, 2023

Related U.S. Application Data

(63) Continuation of application No. PCT/KR2022/003509, filed on Mar. 14, 2022.

(30) Foreign Application Priority Data

Mar. 16, 2021 (RU) .......................... RU2021106875
Jul. 30, 2021 (RU) .......................... RU2021122743

(51) Int. Cl.
*G06T 19/20* (2011.01)
*G06T 7/50* (2017.01)
(Continued)

(52) U.S. Cl.
CPC ............... *G06T 19/20* (2013.01); *G06T 7/50* (2017.01); *G06T 7/70* (2017.01); *G06T 17/20* (2013.01);
(Continued)

(58) Field of Classification Search
None
See application file for complete search history.

(56) References Cited

U.S. PATENT DOCUMENTS

| 10,776,861 B1 | 9/2020 | Haitani et al. |
| 2004/0080530 A1* | 4/2004 | Lee .......................... G06F 3/147 |
| | | 715/738 |

(Continued)

FOREIGN PATENT DOCUMENTS

| CN | 108269302 B | 8/2020 |
| CN | 112258269 A | 1/2021 |

(Continued)

OTHER PUBLICATIONS

Partial European Search Report issued on May 27, 2024 by the European Patent Office for European Patent Application No. 22771690.9.

(Continued)

*Primary Examiner* — David H Chu
(74) *Attorney, Agent, or Firm* — Sughrue Mion, PLLC

(57) ABSTRACT

Provided are virtual try-on applications, telepresence applications, relating to modeling realistic clothing worn by humans and realistic modeling of humans in three-dimension (3D). Proposed is a hardware comprising software products that perform method for imaging clothes on a person, that is adapted to the body pose and the body shape, based on point cloud draping model, the method including using of point cloud and a neural network that synthesizes such point clouds to capture/model the geometry of clothing outfits, and using of point based differentiable neural rendering to capture the appearance of clothing outfits.

8 Claims, 7 Drawing Sheets

(51) Int. Cl.
G06T 7/70 (2017.01)
G06T 17/20 (2006.01)
(52) U.S. Cl.
CPC .............................. G06T 2200/24 (2013.01);
G06T 2207/10016 (2013.01); G06T
2207/10024 (2013.01); G06T 2207/20021
(2013.01); G06T 2207/20081 (2013.01); G06T
2207/20084 (2013.01); G06T 2207/30196
(2013.01); G06T 2210/16 (2013.01); G06T
2210/56 (2013.01); G06T 2219/2012
(2013.01); G06T 2219/2021 (2013.01); G06T
2219/2024 (2013.01)

(56) References Cited

U.S. PATENT DOCUMENTS

| | | | | |
|---|---|---|---|---|
| 2014/0176565 | A1* | 6/2014 | Adeyoola | G06F 16/5854 345/473 |
| 2015/0012426 | A1* | 1/2015 | Purves | G02B 27/017 705/41 |
| 2017/0352091 | A1 | 12/2017 | Chen et al. | |
| 2019/0371080 | A1* | 12/2019 | Sminchisescu | G06T 17/20 |
| 2020/0066052 | A1* | 2/2020 | Antonsen | G06T 19/006 |
| 2021/0049811 | A1 | 2/2021 | Fedyukov et al. | |

FOREIGN PATENT DOCUMENTS

| | | |
|---|---|---|
| GB | 2583687 A | 11/2020 |
| RU | 2 718 362 C1 | 4/2020 |
| RU | 2 729 166 C1 | 8/2020 |
| WO | 2020/131518 A1 | 6/2020 |
| WO | 2021/009062 A1 | 1/2021 |

OTHER PUBLICATIONS

Communication dated Jun. 23, 2022, issued by the International Searching Authority in counterpart International Application No. PCT/KR2022/003509 (PCT/ISA/210 and PCT/ISA/237).
Minar et al., "CloTH-VTON+: Clothing Three-Dimensional Reconstruction for Hybrid Image-Based Virtual Try-ON," IEEEAccess, vol. 9, pp. 30960-30978, Feb. 16, 2021, Total 20 pages.
Mazur et al., "Cloud Transformers," arXiv:2007.11679v2, pp. 1-15, Dec. 9, 2020, Total 16 pages.
Communication (Search Report) dated Jun. 2, 2022, issued by the Russian Patent Office (Rospatent) in counterpart Russian Application No. 2021122743.
Communication (Decision to Grant) dated Jun. 9, 2022, issued by the Russian Patent Office (Rospatent) in counterpart Russian Application No. 2021122743.
Loper et al., "SMPL: A Skinned Multi-Person Linear Model," ACM Transactions on Graphics, vol. 34, No. 6, Article 248, Nov. 2015, Total 16 pages.
Aliev et al., "Neural Point-Based Graphics," Proc. ECCV, vol. 12367 of Lecture Notes in Computer Science, pp. 696-712. Springer, 2020.
Alldieck et al., "Learning to Reconstruct People in Clothing from a Single RGB Camera," Proc. CVPR, pp. 1175-1186, 2019.
Alldieck et al., "Video Based Reconstruction of 3D People Models," Proc. CVPR, pp. 8387-8397, 2018.
Alldieck et al., "Tex2Shape: Detailed Full Human Body Geometry From a Single Image," Proc. ICCV, pp. 2293-2303, 2019.
Ayush et al., "Powering Virtual Try-On via Auxiliary Human Segmentation Learning," Proceedings of the IEEE/CVF International Conference on Computer Vision (ICCV) Workshops, Oct. 2019, Total 4 pages.
Bertiche et al., "CLOTH3D: Clothed 3D Humans," Proc. ECCV, arXiv:1912.02792v2., Sep. 2020.
Bhatnagar et al., "Multi-Garment Net: Learning to Dress 3D People from Images," Proc. ICCV, pp. 5420-5430, Oct. 2019.

Bogo et al., "Keep it SMPL: Automatic Estimation of 3D Human Pose and Shape from a Single Image," arXiv:1607.08128v1, Jul. 2016, Total 18 pages.
Bojanowski et al., "Optimizing the Latent Space of Generative Networks," Proceedings of the 35th International Conference on Machine Learning, PMLR vol. 80, 2018, Total 10 pages.
Cao et al., "OpenPose: Realtime Multi-Person 2D Pose Estimation using Part Affinity Fields," IEEE Transactions on Pattern Analysis and Machine Intelligence, arXiv: 1812.08008v2, May 2019, Total 14 pages.
Gabeur et al., "Moulding Humans: Non-parametric 3D Human Shape Estimation from Single Images," ICCV, pp. 2232-2241, 2019.
Gong et al., "Graphonomy: Universal Human Parsing via Graph Transfer Learning," Proc. CVPR, pp. 7450-7459, 2019.
Guan et al., "DRAPE: DRessing Any PErson," ACM Transactions on Graphics, vol. 31, No. 4, Jul. 2012, Total 10 pages.
Güler et al., "DensePose: Dense Human Pose Estimation in the Wild," Proc. CVPR, pp. 7297-7306, 2018.
Gundogdu et al., "GarNet: A Two-Stream Network for Fast and Accurate 3D Cloth Draping," arXiv:1811.10983v3, Aug. 2019, Total 10 pages.
Han et al., "VITON: An Image-based Virtual Try-on Network," Proc. CVPR, pp. 7543-7552, 2018.
Hsiao et al., "Fashion++: Minimal Edits for Outfit Improvement," Proc. ICCV, pp. 5047-5056, 2019.
Huang et al., "Arbitrary Style Transfer in Real-time with Adaptive Instance Normalization," Proc. ICCV, pp. 1501-1510, 2017.
Huang et al., "ARCH: Animatable Reconstruction of Clothed Humans," Proc. CVPR, pp. 3093-3102, 2020.
Grigorev et al., "StylePeople: A Generative Model of Fullbody Human Avatars," Proc. CVPR, pp. 5151-5160, 2021.
Issenhuth et al., "Do Not Mask What You Do Not Need to Mask: a Parser-Free Virtual Try-On," Proc. ECCV, 2020, Total 10 pages.
Lee et al., "LA-VITON: A Network for Looking-Attractive Virtual Try-On," Proc. ICCV, Oct. 2019, Total 4 pages.
Jetchev et al., "The Conditional Analogy GAN: Swapping Fashion Articles on People Images," arXiv:1709.04695v1, Proc. ICCV, 2017, Total 7 pages.
Johnson et al., "Perceptual Losses for Real-Time Style Transfer and Super-Resolution," Proc. ECCV, 2016.
Kanazawa et al., "End-to-end Recovery of Human Shape and Pose," Proc. CVPR, pp. 7122-7131, 2018.
Karras et al., "A Style-Based Generator Architecture for Generative Adversarial Networks," Proc. CVPR, pp. 4401-4410, 2019.
Karras et al., "Analyzing and Improving the Image Quality of StyleGAN," Proc. CVPR, pp. 8110-8119, 2020.
Kingma et al., "adam: a Method for Stochastic Optimization," arXiv:1412.6980v9, Jan. 2017 (Published as a conference paper at ICLR 2015).
Lähner et al., "DeepWrinkles: Accurate and Realistic Clothing Modeling," Proc. ECCV, 2018, Total 18 pages.
Laine et al., "Modular Primitives for High-Performance Differentiable Rendering," arXiv:2011.03277v1, ACM Transactions on Graphics, vol. 39, No. 6, Article 194, 2020, Total 14 pages.
Lewis et al., "VOGUE: Try-On by StyleGAN Interpolation Optimization," 2021, Total 15 pages.
Liu et al., "Morphing and Sampling Network for Dense Point Cloud Completion," arXiv:1912.00280v1, Nov. 2019, Total 9 pages.
Loper et al., "OpenDR: An Approximate Differentiable Renderer," Proc. ECCV, vol. 8695 of Lecture Notes in Computer Science, pp. 154-169, Springer International Publishing, Sep. 2014.
Ma et al., "Learning to Dress 3D People in Generative Clothing," Proc. CVPR, pp. 6469-6478, 2020.
Meshry et al., "Neural Rerendering in the Wild," Proc. CVPR, pp. 6878-6887, Jun. 2019.
Minar et al., "CloTH-VTON: Clothing Three-dimensional reconstruction for Hybrid image-based Virtual Try-ON," Proceedings of the Asian Conference on Computer Vision (ACCV), Nov. 2020, Total 19 pages.

(56) References Cited

OTHER PUBLICATIONS

Minar et al., "CP-VTON+: Clothing Shape and Texture Preserving Image-Based Virtual Try-On," The IEEE/CVF Conference on Computer Vision and Pattern Recognition (CVPR) Workshops, Jun. 2020, Total 4 pages.
Mir et al., "Learning to Transfer Texture from Clothing Images to 3D Humans," Proc. CVPR, pp. 7023-7034, Jun. 2020.
Natsume et al., "SiCloPe: Silhouette-Based Clothed People," Proc. CVPR, pp. 4480-4490, 2019.
Neuberger et al., "Image Based Virtual Try-on Network from Unpaired Data," Proc. CVPR, pp. 5184-5193, Jun. 2020.
Patel et al., "TailorNet: Predicting Clothing in 3D as a Function of Human Pose, Shape and Garment Style," Proc. CVPR, pp. 7365-7375, 2020.
Pavlakos et al., "Expressive Body Capture: 3D Hands, Face, and Body from a Single Image," Proc. CVPR, pp. 10975-10985, 2019.
Pons-Moll et al., "ClothCap: Seamless 4D Clothing Capture and Retargeting," ACM Transactions on Graphics, (Proc. SIGGRAPH), vol. 36, No. 4, Article 73, Jul. 2017, Total 15 pages.
Qi et al., "PointNet: Deep Learning on Point Sets for 3D Classification and Segmentation," Proc. CVPR, pp. 652-660, 2017.
Raj et al., "SwapNet: Image Based Garment Transfer," Proc. ECCV, 2018, Total 17 pages.
Ravi et al., "Accelerating 3D Deep Learning with PyTorch3D," arXiv:2007.08501, Jul. 2020, Total 18 pages.
Ronneberger et al., "U-Net: Convolutional Networks for Biomedical Image Segmentation," Medical Image Computing and Computer-Assisted Intervention (MICCAI), Part III, LNCS vol. 9351, pp. 234-241, Springer, 2015.
Saito et al., "PIFu: Pixel-Aligned Implicit Function for High-Resolution Clothed Human Digitization," Proc. ICCV, pp. 2304-2314, 2019.
Saito et al., "PIFuHD: Multi-Level Pixel-Aligned Implicit Function for High-Resolution 3D Human Digitization," Proc. CVPR, pp. 84-93, 2020.
Shen et al., "GAN-based Garment Generation Using Sewing Pattern Images," Proc. ECCV, 2020, Total 23 pages.
Thies et al., "Deferred Neural Rendering: Image Synthesis using Neural Textures," arXiv:1904.12356v1, Apr. 2019, Total 12 pages.
Varol et al., "BodyNet: Volumetric Inference of 3D Human Body Shapes," Proc. ECCV, 2018, Total 17 pages.
Wang et al., "Toward Characteristic-Preserving Image-based Virtual Try-On Network," Proc. ECCV, 2018, Total 16 pages.
Wang et al., "Image Quality Assessment: From Error Visibility to Structural Similarity," IEEE Transactions on Image Processing, vol. 13, No. 4, Apr. 2004, Total 14 pages.
Wiles et al., "SynSin: End-to-end View Synthesis from a Single Image," Proc. CVPR, pp. 7467-7477, 2020.
Xiang et al., "MonoClothCap: Towards Temporally Coherent Clothing Capture from Monocular RGB Video," arXiv:2009.10711v2, Nov. 2020, Total 18 pages.
Yang et al., "Towards Photo-Realistic Virtual Try-On by Adaptively Generating↔Preserving Image Content," Proc. CVPR, pp. 7850-7859, 2020.
Yildirim et al., "Generating High-Resolution Fashion Model Images Wearing Custom Outfits," Proc. ICCV, Oct. 2019, Total 4 pages.
Yoon et al., "Neural 3D Clothes Retargeting from a Single Image," arXiv:2102.00062v1, Jan. 2021, Total 20 pages.
Zhang et al., "The Unreasonable Effectiveness of Deep Features as a Perceptual Metric," Proc. CVPR, pp. 586-595, 2018.
Zheng et al., "DeepHuman: 3D Human Reconstruction From a Single Image," Proc. ICCV, pp. 7739-7749, Oct. 2019.
M. F. Hashmi et al., "FashionFit: Analysis of Mapping 3D Pose and Neural Body Fit for Custom Virtual Try-On," in IEEE Access, vol. 8, pp. 91603-91615, May 11, 2020, doi: 10.1109/ACCESS.2020.2993574.
Thibaut Issenhuth et al. "End-to-End Learning of Geometric Deformations of Feature Maps for Virtual Try-On", Jun. 10, 2019, 12 pages, ArXiv abs/1906.01347v2 [cs.CV].
European Extended Search Report issued Oct. 1, 2024 by the European Patent Office for EP Patent Application No. 22771690.9.

* cited by examiner

POINT-BASED MODELING OF HUMAN CLOTHING

CROSS-REFERENCE TO RELATED APPLICATIONS

This application is a bypass continuation of International Application No. PCT/KR2022/003509, filed on Mar. 14, 2022, which is based on and claims priority to Russian Patent Application No. 2021106875, filed Mar. 16, 2021, in the Federal Service for Intellectual Property (ROSPATENT), and Russian Patent Application No. 2021122743, filed Jul. 30, 2021, in the Federal Service for Intellectual Property (ROSPATENT), the disclosures of which are incorporated by reference herein in their entireties.

BACKGROUND

Embodiments of the present disclosure relate to virtual try-on applications, telepresence applications, and in particular to modeling realistic clothing worn by humans and realistic modeling of humans in three-dimension (3D).

Modeling realistic clothing worn by humans is a big part of the overarching task of realistic modeling of humans in 3D. Its practical applications include virtual clothing try-on as well as enhancing the realism of human avatars for telepresence systems. Modeling clothing is difficult since outfits have wide variations in geometry (including, for example, topological changes) and in appearance (including, for example, wide variability of textile patterns, prints, as well as complex cloth reflectance). In particular, modeling interaction between clothing outfits and human bodies is an especially daunting task.

Many related art methods model clothing geometry using one or several predefined outfit templates of fixed topology. DRAPE learns from Physic-based simulation (PBS) and allows for pose and shape variation for each learned outfit mesh. Some related art represent outfit templates in the form of offsets (displacements) to SMPL mesh. ClothCap employs such a technique and captures more fine-grained details learned from the new dataset of 4D scans. DeepWrinkles also addresses the problem of fine-grained wrinkles modeling with the use of normal maps generated by a conditional GAN. GarNet incorporates two-stream architecture and makes it possible to simulate outfit meshes at the level of realism that almost matches PBS, while being two orders of magnitude faster. TailorNet follows the same SMPL-based template approach, but models the outfit deformations as a function of pose, shape and style simultaneously. It also shows greater inference speed than GarNet. The CAPE system uses graph ConvNet-based generative shape model that enables to condition, sample, and preserve fine shape detail in 3D meshes.

Several other works recover clothing geometry simultaneously with the full body mesh from image data. BodyNet and DeepHuman are voxel-based methods that directly infer the volumetric dressed body shape from a single image. In SiCloPe use similar approach, but synthesize the silhouettes of the subjects in order to recover more details. HMR utilizes SMPL body model to estimate pose and shape from an input image. Some approaches such as PIFu and ARCH employ end-to-end implicit functions for clothed human 3D reconstruction and are able to generalize to complex clothing and hair topology, while PIFuHD recovers higher resolution 3D surface by using two-level architecture. MouldingHumans predicts the final surface from estimated "visible" and "hidden" depth maps. MonoClothCap demonstrates promising results in video-based temporally coherent dynamic clothing deformation modeling. A design relatively simple yet effective pipeline for template-based outfit mesh retargeting.

Modeling clothing appearance. A large number of work focus on direct image-to-image transfer of clothing bypassing 3D modeling. Thus, related art address the task of transferring a desired clothing item onto the corresponding region of a person given their images. CAGAN proposed to utilize image-to-image conditional GAN to solve this task. VITON follows the idea of image generation and uses non-parametric geometric transform which makes all the procedure two-stage, similar to SwapNet [48] with the difference in the task statement and training data. CP-VTON further improves upon by incorporating a full learnable thin-plate spline transformation, followed by CP-VTON+, LAVITON, and ACGPN. While the above-mentioned related art rely on pre-trained human parsers and pose estimators, the work of some related art achieve competitive image quality and significant speedup by employing a teacher-student setting to distill the standard virtual try-on pipeline. The resulting student network does not invoke an expensive human parsing network at inference time. VOGUE trains a pose-conditioned StyleGAN2 and finds the optimal combination of latent codes to produce high-quality try-on images.

Some methods make use of both 2D and 3D information for model training and inference. Cloth-VTON employs 3D-based warping to realistically retarget a 2D clothing template. Pix2Surf allows to digitally map the texture of online retail store clothing images to the 3D surface of virtual outfit items enabling 3D virtual try-on in real-time. Other related art research extend the scenario of single template cloth retargeting to multi-outfit dressing with unpaired data, generating high-resolution fashion model images wearing custom outfits, or editing the style of a person in the input image.

Octopus and Multi-Outfit Net (MGN) recover the textured clothed body mesh based on the SMPL+D model. The latter method treats clothing meshes separately from the body mesh, which gives it the ability to transfer the outfit to another subject. Tex2Shape proposes an interesting framework that turns the shape regression task into an image-to-image translation problem. In [53], a learning based parametric generative model is introduced that can support any type of outfit material, body shape, and most outfit topologies. StylePeople approach integrates polygonal body mesh modeling with neural rendering, so that both clothing geometry and the texture are encoded in the neural texture, and relies on neural rendering, however proposed handling of geometry is more explicit.

Embodiments are directed to a more explicit geometric modeling, especially for loose clothing.

SUMMARY

According to an aspect of an embodiment, there is provided a method for training a draping network for modeling an outfit on a person, the outfit corresponding to a body pose and a body shape of a person, the method includes providing a set of frames of persons, each person wearing an outfit and the frames being video sequences in which each person makes movements, obtaining for each frame among the frames Skinned Multi-Person Linear (SMPL) meshes corresponding to a pose and a shape of a body of a person included in the frame, obtaining, for each frame among the frames, outfit mesh corresponding to the pose and the shape of the body of the person included in the frame, generating an initial point cloud as a set of vertices of the SMPL meshes for each frame, setting randomly initialized d-dimensional code vector corresponding to outfit style encoding for each person, inputting the initial point clouds in a Cloud Transformer neural network of a draping network and inputting the outfit code vectors in a Multi-Layer Perceptron (MLP) neural network encoder, processing the outfit code vector with an MLP encoder neural network and passing the output of the MLP encoder neural network to the Cloud Transformer neural network, to deform the initial input point cloud providing the output of the MLP encoder neural network and output the predicted point cloud of the outfit for each frame, obtaining, after processing all frames from the set of frames of persons, pre-trained draping network including weights of the trained MLP encoder neural network, weights of the trained Cloud Transformer neural network, outfit code vectors of encoding styles of all persons, inputting, by pre-trained draping network, appropriate style of outfit, corresponding one of the vectors and one of the point clouds, on a body shape and a body pose of a user.

According to an aspect of an embodiment, there is provided a method for obtaining predicted point cloud of outfit and an outfit code vector from an image of a material person in outfit for modeling the outfit on a person, the outfit being adapted to a body pose and a body shape of a person, the method includes obtaining, by detecting device, an image of a material person in outfit, predicting Skinned Multi-Person Linear (SMPL) mesh in the desired pose and body shape from the image by the SMPLify method, generating an initial point cloud as a vertice of the SMPL mesh for the image, predicting a binary outfit mask corresponding the pixels of the outfit in the image by a segmentation network, initializing, with random values, d-dimensional outfit code vector for outfit style encoding for the image, inputting the initial point cloud and the outfit code vector into a pre-trained draping network, trained according to claim 1, obtaining a predicted point cloud of the outfit from the pre-trained draping network output, projecting the outfit point cloud to a black-and-white image with camera parameters of the image of the person, comparing, by obtaining a loss function, a projection of the predicted point cloud on the image with a ground truth binary outfit mask corresponding the pixels of the outfit in the image via a chamfer distance between a two-dimensional (2D) point clouds, which are projections of three-dimensional (3D) point clouds, optimizing the outfit code vector based on the obtained loss function, inputting, by the obtained outfit code vector, predicted point cloud of the outfit of the image on any body shape and any body pose of a user.

According to another aspect of an embodiment, there is provided a method for modeling outfit on a person, the outfit being adapted to a body pose and a body shape of any person, the method includes providing a color video stream of a first person, choosing, by a user, an outfit corresponding to a video of a second person in an outfit, obtaining a predicted point cloud of outfit and an outfit code vector according to a method for any of frame included in the video, initializing, with random values, n-dimensional appearance descriptor vector corresponding to each point of the point cloud, generating, by rasterization block, a 16-channeled image tensor with the use of the 3D coordinates of each point and the neural descriptor of each point, and a binary black-white mask corresponding to the pixels of the image covered by the points, processing, by the rendering network, the 16-channeled image tensor along with the binary black-white mask for obtaining outfit red-green-blue (RGB) color image and the outfit mask, optimizing rendering network weights and appearance descriptors values based on the ground truth video-sequence of a person to obtain the desired outfit appearance, imaging to a user, by a screen, video of the first person in the outfit of second person, by the predicted rendered outfitting image given body pose and body shape, wherein the user is inputs videos of a person and views the learned colored outfitting model retargeted to new body shapes and new body poses, rendered on top of the new video to dress the persona image from a video in an outfit chosen by the user.

The method may further include imaging, to the user, colored outfitting model over the user, the user being a real person.

According to another aspect of an embodiment, there is provided a system for modeling outfit on a person including a detecting device connected to a computer system including a processor configured to be implemented as an operating unit connected to a display screen and a selection interface, wherein the detecting device is configured to obtain a color video stream of first real person in real time, wherein the selection interface being configured to receive an input by a user choosing an outfit based on a video of the second person in the outfit, and wherein the display screen is configured to display the first person in real time in the outfit selected by a user from the videos based on data received from the operation unit.

The user may be the first person.

The training of the pre-trained network may include providing a set of frames of persons, each person wearing an outfit and the frames being video sequences in which each person makes movements, obtaining for each frame among the frames Skinned Multi-Person Linear (SMPL) meshes corresponding to a pose and a shape of a body of a person included in the frame, obtaining, for each frame among the frames, outfit mesh corresponding to the pose and the shape of the body of the person included in the frame, generating an initial point cloud as a set of vertices of the SMPL meshes for each frame, setting randomly initialized d-dimensional code vector corresponding to outfit style encoding for each person, inputting the initial point clouds in a Cloud Transformer neural network of a draping network and inputting the outfit code vectors in a Multi-Layer Perceptron (MLP) neural network encoder, processing the outfit code vector with an MLP encoder neural network and passing the output of the MLP encoder neural network to the Cloud Transformer neural network, to deform the initial input point cloud providing the output of the MLP encoder neural network and output the predicted point cloud of the outfit for each frame, obtaining, after processing all frames from the set of frames of persons, pre-trained draping network including weights of the trained MLP encoder neural network, weights of the trained Cloud Transformer neural network, outfit code vectors of encoding styles of all persons, inputting, by pre-trained draping network, appropriate style of outfit, corresponding one of the vectors and one of the point clouds, on a body shape and a body pose of a user.

The method of obtaining a predicted point cloud of outfit and an outfit code vector for any of frame included in the video may include obtaining, by detecting device, an image of a material person in outfit, predicting Skinned Multi-Person Linear (SMPL) mesh in the desired pose and body shape from the image by the SMPLify method, generating an initial point cloud as a vertice of the SMPL mesh for the image, predicting a binary outfit mask corresponding the pixels of the outfit in the image by a segmentation network, initializing, with random values, d-dimensional outfit code vector for outfit style encoding for the image, inputting the initial point cloud and the outfit code vector into a pre-trained draping network, obtaining a predicted point cloud of the outfit from the pre-trained draping network output, projecting the outfit point cloud to a black-and-white image with camera parameters of the image of the person, comparing, by obtaining a loss function, a projection of the predicted point cloud on the image with a ground truth binary outfit mask corresponding the pixels of the outfit in the image via a chamfer distance between a two-dimensional (2D) point clouds, which are projections of three-dimensional (3D) point clouds, optimizing the outfit code vector based on the obtained loss function, inputting, by the obtained outfit code vector, predicted point cloud of the outfit of the image on any body shape and any body pose of a user.

DESCRIPTION OF DRAWINGS

The above and/or other aspects will be more apparent by describing embodiments with reference to the accompanying drawings, in which.

DETAILED DESCRIPTION

Figure 1:
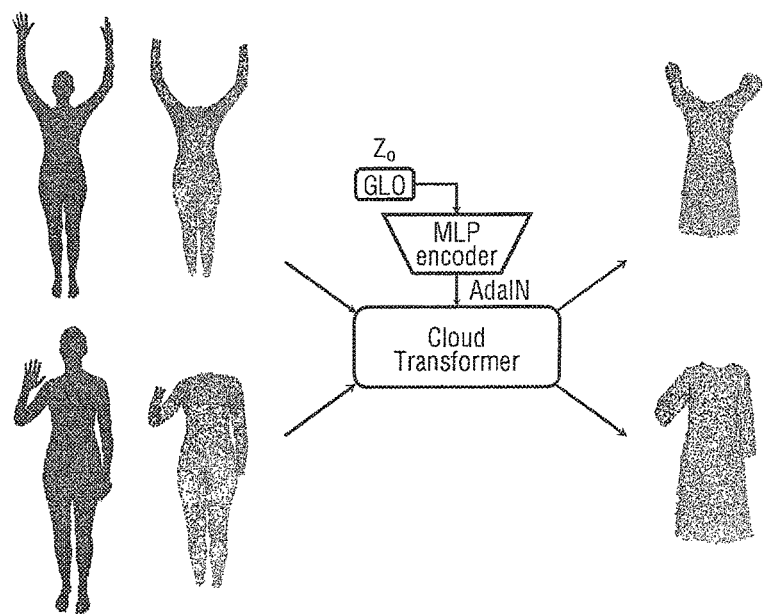
FIG. 1 illustrates proposed approach models the geometry of diverse clothing outfits using point clouds, where bottom row illustrates random point colors.

Embodiments are configured to dress a person captured (or selected, or taken) from one image or video in an outfit of a person captured (or selected, or taken) from another image or video. In addition, the embodiments provide imaging video of real person, possibly in real time, in the screen, wherein the person can choose outfit of any other person captured (or selected, or taken) from any videos or images, and see an image of himself in his chosen outfit (clothes), possibly in real time.

Embodiments are directed to human clothing modeling based on point clouds, and a hardware comprising software products that perform method for geometric modeling clothes on a person, where the clothes is adapted to the body pose and the body shape of the person. A deep model is learned that can predict point clouds of various outfits, for various human poses and for various human body shapes. Outfits of various types and topologies can be handled by the same model. Using the learned model, it is possible to infer geometry of new outfits from as little as a single image, and perform outfit retargeting to new bodies in new poses. Proposed geometric model is completed with appearance modeling that uses the point cloud geometry as a geometric scaffolding, and employs neural point-based graphics to capture outfit appearance from videos and to re-render the captured outfits. Both geometric modeling and appearance modeling aspects according to the embodiment can establish the viability of point-based clothing modeling.

Geometric modeling according to the embodiment differs from related embodiments through the use of a different representations (point clouds), which enables the embodiment to have topological flexibility, the ability to model clothing separately from the body, while also providing the geometric scaffold for appearance modeling with neural rendering.

In contrast to the related embodiments of clothing appearance retargeting, the embodiment uses explicit 3D geometric models, while not relying on individual templates of fixed topology.

According to the embodiment, appearance modeling part requires video sequence, while some of the related embodiments use one or few images.

The point cloud draping model will be described according to embodiments. The goal of the point cloud draping model is to capture the geometry of diverse human outfits draped over human bodies with diverse shapes and poses using point clouds. An embodiment is directed to a latent model for such point clouds that can be fitted to a single image or to more complete data. The combination of the point cloud draping with neural rendering that allows capturing of the appearance of outfits from videos will also be described.

An embodiment is directed to a hardware comprising software products that perform method for imaging clothes on a person, that is adapted to the body pose and the body shape, based on point cloud draping model. The method includes using of point cloud and a neural network that synthesizes such point clouds to capture/model the geometry of clothing outfits and using of point based differentiable neural rendering to capture the appearance of clothing outfits.

An embodiment is directed to a method for training a draping network for modeling outfit on a person, where the outfit is adapted to the body pose and the body shape of any person. The method includes providing (capturing or receiving) set of frames of persons.

For training a draping network, infrastructure for training neural networks and outfit code vectors is used. A certain set of servers—machines that have a central processor, graphics accelerator, motherboard and other components of a modern computer connected into one cluster, or at least one such server, with a minimum amount of 32 GB of RAM and a minimum amount of video memory 18 GB may be used for the training.

A set of frames may be a set of signals recorded on the hard disk. Each person may be wearing an outfit and frames may be video sequences in which each person makes sequence of movements. For each frame Skinned Multi-Person Linear (SMPL) meshes for pose and shape of body of person in the frame may be calculated, for each frame outfit mesh in pose and shape of body of person in the frame may be calculated, an initial point cloud as a set of vertices of the SMPL meshes for each frame may be generated, randomly initialized d-dimensional code vector for outfit style encoding for each person may be set, the initial point clouds and the outfit code vectors into a draping network, namely the initial point clouds on input of a Cloud Transformer neural network of a draping network and feeding the outfit code vectors on input of a Multi-Person Linear (MLP) neural network encoder may be fed, the outfit code vector with an MLP encoder neural network and its output then passed to the Cloud Transformer neural network, which deforms the initial input point cloud given the output of the MLP encoder neural network and outputs the predicted point cloud of the outfit for each frame may be processed, after processing all frames from the set of frames of persons, pre-trained draping network, namely, the weights of the trained MLP encoder neural network, the weights of the trained Cloud Transformer neural network, outfit code vectors of encoding styles of all persons, putting, by pre-trained draping network, appropriate style of outfit, corresponding one of the vectors and one of the point clouds, on any body shape and any body pose choosing by an user may be obtained.

According to an embodiment, there is provided a method for obtaining predicted point cloud of outfit and an outfit code vector from an image of a material person in outfit for modeling the outfit on a person, wherein the outfit is adapted to the body pose and the body shape of any person. The method includes capturing, by detecting device, an image of a material person in outfit, predicting SMPL mesh in the desired pose and body shape from this image by the SMPLify method, generating an initial point cloud as a vertice of the said Skinned Multi-Person Linear (SMPL) mesh for image, predicting a binary outfit mask corresponding the pixels of the outfit in the image by the mentioned segmentation network; initializing, with random values, d-dimensional outfit code vector for outfit style encoding for the image, feeding the initial point cloud and the outfit code vector into a pre-trained draping network, trained, obtaining a predicted point cloud of the outfit from the pre-trained draping network output, projecting the outfit point cloud to a black-and-white image with the given camera parameters of the image of the person, comparing, by calculating the loss function, a projection of this predicted point cloud on the image with the ground truth binary outfit mask corresponding the pixels of the outfit in the image via the chamfer distance between the 2D point clouds, which are projections of 3D point clouds, optimizing the outfit code vector based on the calculated loss function, inputting, by the obtained outfit code vector, predicted point cloud of the outfit of the image on any body shape and any body pose choosing by an user.

According to an embodiment, there is provided a method for modeling outfit on a person, where the outfit is adapted to the body pose and the body shape of any person. The method includes providing a color video stream of first person, choosing, by an user, any outfit according to any video of second person in outfit, by an operating unit of computer system, obtaining predicted point cloud of outfit and an outfit code vector according to method for any of frame of the video, initializing, with random values, n-dimensional appearance descriptor vector for to each point of the point cloud, which response for color, generating, by rasterization block, a 16-channeled image tensor with the use of 3D coordinates of each point and the neural descriptor of each point, and a binary black-white mask corresponding to the pixels of the image covered by the points, processing, by the rendering network, the 16-channeled image tensor to along with the binary black-white mask for obtaining outfit RGB color image and the outfit mask, optimizing rendering network weights and appearance descriptors values according to the ground truth video-sequence of a person to obtain the desired outfit appearance, imaging to an user, by a screen, video of the first person in the outfit of second person, by the predicted rendered outfitting image given body pose and shape, where the user is able to input videos of any person and see the learned colored outfitting model retargeted to new body shapes and poses, rendered on top of this new video, that is, to dress the persona image from any video in any outfit chosen by the user. When the real person is a user, the user colored outfitting model is imaged over the user.

An embodiment also provides a system for modeling outfit on a person using the method, The system includes a detecting device connected to a computer system comprising at least one processor that is implemented as an operating unit connected to a display screen and a selection unit, where the detecting device is configured to capture a color video stream of first real person in real time, the selection unit is configured to allowing a user to choose any outfit according to any video of second person in outfit, the display screen is configured to display said first person in real time in the outfit choosing by a user from the said videos according to data receiving from the operation unit. The user may be the first person.

At least one of the plurality of units may be implemented through an artificial intelligence (AI) model. A function associated with AI may be performed through the non-volatile memory, the volatile memory, and the processor.

The processor may include one or a plurality of processors. One or a plurality of processors may be a general purpose processor, such as a central processing unit (CPU), an application processor (AP), or the like, a graphics-only processing unit such as a graphics processing unit (GPU), a visual processing unit (VPU), and/or an AI-dedicated processor such as a neural processing unit (NPU).

The one or a plurality of processors control the processing of the input data in accordance with a predefined operating rule or artificial intelligence (AI) model stored in the non-volatile memory and the volatile memory. The predefined operating rule or artificial intelligence model is provided through training or learning.

Here, being provided through learning indicates that, by applying a learning algorithm to a plurality of learning data, a predefined operating rule or AI model of a desired characteristic is made. The learning may be performed in a device itself in which AI according to an embodiment is performed, and/o may be implemented through a separate server/system.

The AI model may consist of a plurality of neural network layers. Each layer has a plurality of weight values, and performs a layer operation through calculation of a previous layer and an operation of a plurality of weights. Examples of neural networks include, but are not limited to, convolutional neural network (CNN), deep neural network (DNN), recurrent neural network (RNN), restricted Boltzmann Machine (RBM), deep belief network (DBN), bidirectional recurrent deep neural network (BRDNN), generative adversarial networks (GAN), and deep Q-networks.

The learning algorithm is a method for training a predetermined target device (for example, a robot) using a plurality of learning data to cause, allow, or control the target device to make a determination or prediction. Examples of learning algorithms include, but are not limited to, supervised learning, unsupervised learning, semi-supervised learning, or reinforcement learning.

According to the embodiment, in a method performed by an electronic device, a method for recognizing may obtain output data recognizing an image in the image by using image data as input data for an AI model. The AI model may be obtained by training which may indicate that a predefined operation rule or artificial intelligence model configured to perform a desired feature (or purpose) is obtained by training a basic artificial intelligence model with multiple pieces of training data by a training algorithm. The artificial intelligence model may include a plurality of neural network layers. Each of the plurality of neural network layers includes a plurality of weight values and performs neural network computation by computation between a result of computation by a previous layer and the plurality of weight values.

Visual understanding is a technique for recognizing and processing an object or a scene as human vision does and includes, e.g., object recognition, object tracking, image retrieval, human recognition, scene recognition, 3D reconstruction/localization, or image enhancement.

According to the embodiment, in a method performed by an electronic device, a method for reasoning or predicting may use an AI model to recommend/execute by using data. Processor may perform a pre-processing operation on the data to convert into a form appropriate for use as an input for the AI model. The AI model may be obtained by training which indicates that a predefined operation rule or AI model configured to perform a desired feature (or purpose) is obtained by training a basic AI model with multiple pieces of training data by a training algorithm. The AI model may include a plurality of neural network layers. Each of the plurality of neural network layers includes a plurality of weight values and performs neural network computation by computation between a result of computation by a previous layer and the plurality of weight values.

Reasoning prediction is a technique of logically reasoning and predicting by determining information and includes, e.g., knowledge-based reasoning, optimization prediction, preference-based planning, or recommendation.

Thus, embodiments may replace the need for the user's physical presence for trying on clothes with their virtual presence. This can be especially necessary during times of, for example, a pandemic when it is difficult to try on clothes at a store, and also for people with disabilities, or for the convenience of any person, since in this way person can try on any clothes at any time. In addition, a person can be present in a store, but the person does not need to walk between hangers and change outfits to try on clothes.

In addition, a person can use a computer, laptop, smartphone to try on clothes, appropriate devices can be used to superimpose clothing models over the video of the person standing and/or moving in front of the camera.

In addition, embodiments makes it possible to dress a person from any picture or video in the clothes of any other person.

Such solution can be use also in telepresence systems for clearer drawing of clothes on the body of people, more realistic rendering of their hair and for dressing up human avatars.

Proposed geometric modeling differs from previous works through the use of a different representations (point clouds), which gives proposed approach topological flexibility, the ability to model clothing separately from the body, while also providing the geometric scaffold for appearance modeling with neural rendering.

Embodiments are directed to modifying and processing an image or a set of images (sequence of video frames). These are undoubtedly material objects, namely, the image is a set of signals stored in the memory of any suitable device (for example, a computer, a computer-readable medium, a smartphone, etc.) and the image is received by any suitable device (for example a camera, a smartphone, a detecting device, etc.) from a material captured object (person), and the image is processed by embodiments.

In contrast to related art of clothing appearance retargeting, embodiments use explicit 3D geometric models, while not relying on individual templates of fixed topology.

Embodiments of appearance modeling part requires video sequence, while some related art use one or few images.

Some related art recover the textured clothed body mesh based on the SMPL+D model.

FIG. 1 illustrates proposed approach models the geometry of diverse clothing outfits using point clouds, where the bottom row shows random point colors.

The point clouds are obtained by passing the Skinned Multi-Person Linear (SMPL) model meshes of a human body, consisting of 6890 vertices and 13776 faces each received from a method that predicts the received image, and latent outfit code vectors, consisting of 8 real numbers learned during a training process each, through a pre-trained deep network. Additionally, the embodiment can model clothing appearance using neural point-based graphics, an example of the appearance modeling is shown in the top row of FIG. 1. The outfit appearance can be captured from a video sequence while a single frame is sufficient for point-based geometric modeling. The video sequence is a video in which a person performs arbitrary body movements in his clothes, showing clothes from different sides (for example, rotation in place 360 degrees). Such a video can be obtained, for example, by filming a person from the camera of a mobile device or from a separate professional camera.

Point modeling may indicate point cloud modeling according to embodiments. As a result of modeling on the basis of point clouds, a reconstruction of the geometry of clothes in the form of a 3D point cloud is obtained, which can be carried out from one image (photographs of a person in clothes). One image may be sufficient, since one of the parts of the embodiment is the optimization of the latent code (8-dimensional vector) of clothes for one picture. The embodiment is directed to a system that models clothes in the form of 3D-clouds of points, allowing to reconstruct its structure (geometry) from one image of a person in clothes, and also to adapt this reconstruction to new body postures and body shapes, and having not only one photo, but a whole sequence of frames (video) of a person in his clothes, the system can reconstruct not only the structure (geometry) of clothes, but also its texture (appearance).

The embodiment can be used for telepresence applications in augmented reality, virtual reality, on 3D displays, etc. It can also be used on regular 2D screens in programs/environments, where images of clothed people need to be displayed.

According to an embodiment, realistic models of people clothing are created that can be animated over body mesh models for arbitrary body pose parameters and body shape parameters, the deformable geometry of clothing is captured by a point cloud, the geometric model of a new clothing outfit can be created from as little as a single image, the realistic model of a clothing outfit suitable for re-rendering can be created from a video.

Embodiments are directed to the use of point clouds and a neural network that synthesizes such point clouds to capture and model the geometry of clothing outfits, and the use of point based differentiable neural rendering to capture the appearance of clothing outfits.

The method according to an embodiment can be implemented using any device with powerful enough computing unit (e.g. GPU) and a screen, such as, for example, a computer, smartphone. In addition, the method according to an embodiment can be stored on computer-readable medium in view of instructions for executing on a computer.

Modeling realistic clothing worn by humans is a big part of the overarching task of realistic modeling of humans in 3D. Clothing modeling is difficult since outfits have wide variations in geometry (including topological changes) and in appearance (including wide variability textile textures, prints, and complex reflectance of cloth). Furthermore, physical modeling of clothes' static and dynamic interaction with the body is complex.

According to an embodiment, the clothing geometry is modeled as a relatively sparse point-cloud. Using a recently introduced synthetic dataset of simulated clothing, a joint geometric model of diverse human clothing outfits is learned. The model describes a particular outfit with a latent code vector (the outfit code) of dimension d, where d is a positive integer number (for example, d=8 in proposed experiments, a hyperparameter tuned during the training process). The outfit code is a d-dimensional numeric vector, that is, an ordered set of d real numbers, where d is some natural number. For a given outfit code and a given human body geometry (for which used is the most popular SMPL format), a deep neural network (the draping network) then predicts the point cloud that approximates the outfit geometry draped over the body.

According to embodiments, it is possible to cover diverse outfits with varying topology using a single latent space of outfit codes and a single draping network. This is made possible because of the choice of the point cloud representation and the use of point cloud-specific losses during the learning of the joint model. After learning, the model is capable of generalizing to new outfits, capturing their geometry from data, and to drape the acquired outfits over bodies of varying shapes and in new poses. With proposed model, acquiring the outfit geometry can be done from as little as a single image.

A method according to an embodiment is extended beyond geometry acquisition to include the appearance modeling. Here, ideas of differentiable rendering and neural point based graphics is used. When a video-sequence of an outfit worn by a person is given, the photometric properties of the outfit using neural descriptors attached to points in the point cloud, and the parameters of a rendering (decoder) network is captured. The fitting of the neural point descriptors and the rendering network (which capture the photometric properties) is performed jointly with the estimation of the outfit code (which captures the outfit geometry) within the same optimization process. After fitting, the outfit can be transferred and re-rendered in a realistic way over new bodies and in new poses.

In the experiments, the ability of proposed geometric model to capture the deformable geometry of new outfits using point clouds is evaluated. In addition, the capability of method according to an embodiment to capture both outfit geometry and texture from videos and to re-render the learned outfits to new targets is tested.

The point cloud draping model will be described. The goal of this model is to capture the geometry of diverse human outfits draped over human bodies with diverse shapes and poses using point clouds. A latent model for such point clouds that can be fitted to a single image or to more complete data is provided according to an embodiment. Then the combination of the point cloud draping with neural rendering that allows to capture the appearance of outfits from videos is described.

The model using generative latent optimization (GLO) may be learned. The training set has a set of N outfits, and associate each outfit with d-dimensional vector z (the outfit code). Thus randomly initialized is $\{z_1 \ldots, z_N\}$, where $z_i \in Z \subseteq \mathbb{R}^d$ for all i=1, ..., N. Here, Z is an outfit code vector space and $\mathbb{R}^d$ is the d-dimensional space of real numbers (space of real vectors of the length d).

During training, for each outfit, its shape for a diverse set of human poses is observed. The target shapes are given by a set of geometries. In an embodiment, synthetic CLOTH3D dataset that provides shapes in the form of meshes of varying topology may be used. In this dataset, each subject is wearing an outfit and performs a sequence of movements. For each outfit i for each frame j in the corresponding sequence, sampled are points from the mesh of this outfit and obtain the point cloud $x_i^j \in X$, where X denotes the space of point clouds of a fixed size (8192 is used in proposed experiments). The length of the training sequence of the i-th outfit is denoted as Pi. The body mesh $s_i^j \in S$ is given, and proposed experiments work with the SMPL mesh format (thus S denotes the space of SMPL meshes for varying body shape parameters and body pose parameters). The dataset $\{(z_i, s_i^j, x_i^j)\}$ i=1 ... N, j=1 ... $P_i$ of outfit codes, SMPL meshes, and clothing point clouds is obtained.

As embodiments are directed to learning to predict the geometry in new poses and for new body shapes, the draping function $G_\theta : Z \times S \to X$ that maps the latent code and the SMPL mesh (characterizing the naked body) to the outfit point cloud is introduced. Here, θ denotes the learnable parameters of the function. Then performed is learning by the optimization of the following Equation 1.

[Equation 1]

$$\min_{\substack{\theta \in \Theta \\ \{z_1, \ldots, z_N\}}} \frac{1}{N} \sum_{i=1}^{N} \frac{1}{P_i} \sum_{j=1}^{P_i} L_{3D}(G_\theta(z_i, s_i^j), x_i^j) \quad (1)$$

Here, θ is parameters of the draping network to be optimized, Θ is tensor space of parameters of the draping network, z1, ..., zN are outfit code vectors to be optimized, N is a number of the training objects, Pi is a number of body poses of the training object number i, L3D is a loss function that measures the 3D reconstruction quality (distance between two point clouds), Gθ is a draping network, $s_i^j$ is a 3D point cloud sampled from the surface of the cut (with removed hands, feet and head vertices) SMPL human body mesh of an object number i in the body pose number j.

$x_i^j$ is a ground truth outfit 3D point cloud of an object number i in the body pose number j.

In Equation 1, the objective is the mean reconstruction loss for the training point clouds over the training set. The loss L3D is the 3D reconstruction loss. In experiments according to embodiments, an approximate algorithm to calculate the Earth Mover's Distance as a function of the 3D reconstruction loss is used. As this loss measures the distance between point clouds and ignores all topological properties, learning formulation according to an embodiment is naturally suitable for learning outfits of diverse topology.

Optimization jointly over the parameters of proposed draping function $G_\theta$ and over the latent outfit code $z_i$ for all i=1, ..., N is performed. To regularize the process, the outfit codes to the unit ball during optimization are clipped.

The optimization process thus establishes the outfit latent code space and the parameters of the draping function.

The draping function $G_\theta(z, s)$ as a neural network that takes the SMPL mesh s and transforms this point cloud into the outfit point cloud may be implemented. Recently, point clouds have become near first class citizens in the deep learning world, as a number of architectures that can input and/or output point clouds and operate on them have been proposed. In proposed work, used is the recently introduced Cloud Transformer architecture due to its excellent results across a range of diverse tasks.

The cloud transformer comprises of blocks, each of which sequentially rasterizes, convolves, and de-rasterizes the point cloud at the learned data-dependent positions. The cloud transformer thus deforms the input point cloud (derived from the SMPL mesh as discussed below) into the output point cloud x over a number of blocks. Used is a simplified version of the cloud transformer with single-headed blocks to reduce the computational complexity and memory requirements. According to embodiments, the architecture of the generator suggested for image-based shape reconstruction, which in their case takes the point cloud (sampled from the unit sphere) and a vector (computed by the image encoding network) as an input and outputs the point cloud of the shape depicted in the image is considered. The part of the neural network architecture, consisting cloud transformer, is identical to that proposed for the problem of reconstructing point cloud from an image (with exception of "single-headed blocks" modification, that is, in the proposed invention reduced are the number of in parallel "heads" of the transformer). Their case may indicate the original architecture cloud transformer for image-based point cloud reconstruction, the input of which is an image and a point cloud in the form of a single 3D sphere of points.

According to an embodiment, the input point cloud and the vector (outfit code—an ordered set of 8 real numbers, which is first initialized with random values, and then, during training, changes its values so that one vector corresponds to one specific style of clothing) are different and correspond to the SMPL mesh and the outfit code respectively. The SMPL mesh in this case is synonymous with the word 3D model, that is, a 3D SMPL model. And the SMPL 3D model is a set of 6890 vertices, each with 3D coordinates, and 13776 triangles (faces), each triangle consisting of three vertices. This 3D model is directed to accurately simulating the human body of various shapes and postures. The point cloud encoding the body posture and body shape of a person, and the vector encoding the desired style of a person's clothing are different entities fed to the input of the draping network separately from each other, at different entry points.

More specifically, to input the SMPL mesh into the cloud transformer architecture, first the parts of the mesh corresponding to the head, the feet and the hands are removed. Then the vertices as a point cloud remaining are considered. The vertices in this case are the points specified in the SMPL model, of which there are a total of 6890, and which are connected by edges. Each vertex has a serial number in the SMPL model and its own 3D coordinates each, and the set of all these 6890 vertices is nothing more than a 3D point cloud, similar to the human body. Thus, the parts of the 3D model of the human body SMPL associated with the hands, feet and head are removed, and the remaining vertices from this 3D model as an input point cloud (3D point cloud sampled from the surface of the cut SMPL human body mesh of an object number i in the body pose number j) are considered. In addition to these 6890 points, a certain number of points is taken, obtained by taking the midpoints of the edges connecting these vertices, to make the point cloud more densify. To densify this point cloud, the midpoints of the SMPL mesh (3D model) edges are added to this point cloud. The resulting point cloud (which is shaped by the SMPL mesh and reflects the change of pose and shape) is input into the cloud transformer.

The latent outfit code z is input into the cloud transformer through AdaIn connections that modulate the convolutional maps inside the rasterization-derasterization blocks. The particular weights and biases for each AdaIn connection are predicted from the latent code z via a perceptron, as is common for style-based generators. While good results using the (simplified) cloud transformer architecture are obtained, other deep learning architectures that operate on point clouds (e.g. PointNet) can be employed.

Figure 2:
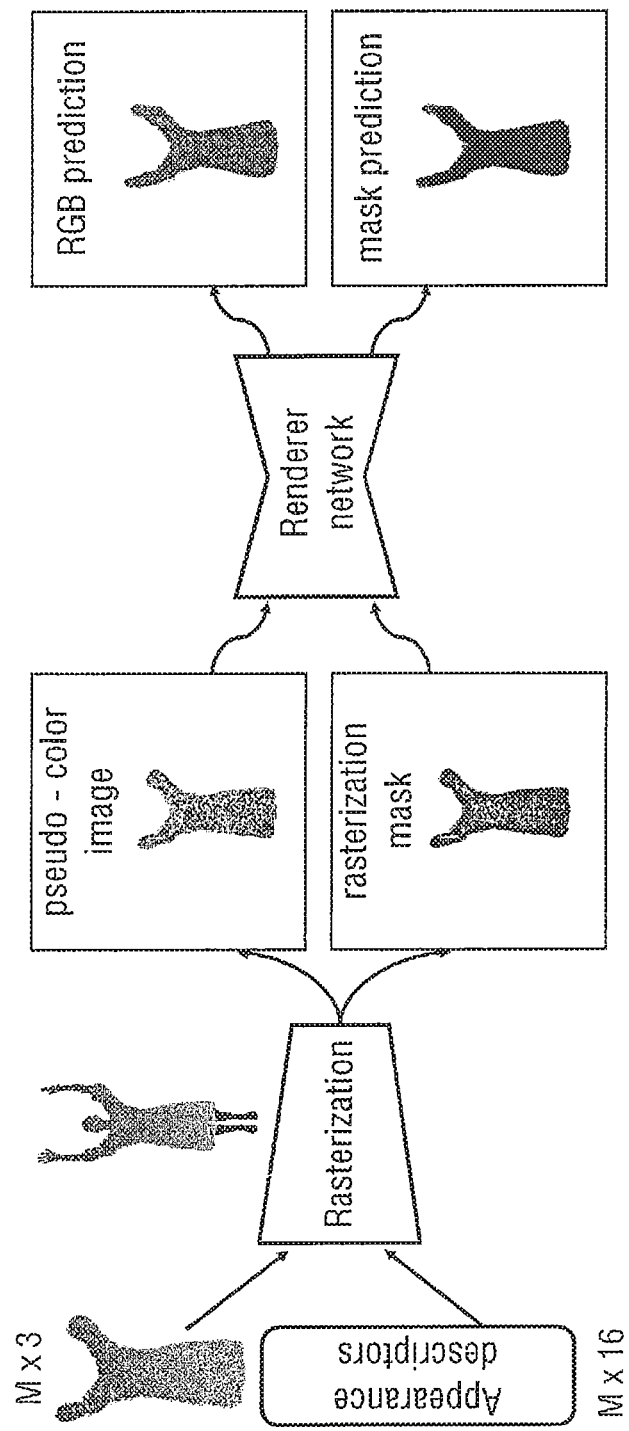
FIG. 2 illustrates color-coded results of the draping networks.

In addition, it is necessary to note that the morphing implemented by the draping network is strongly non-local (i.e. proposed model does not simply compute local vertex displacements), and is consistent across outfits and poses (FIG. 2). FIG. 2 illustrates color-coded results of the draping networks. Each row corresponds to a pose. The leftmost image shows the input to the draping network. The remaining columns correspond to three outfit codes. Color coding corresponds to spectral coordinates on the SMPL mesh surface. Color coding reveals that the draping transformation is noticeably non-local (i.e. the draping network does not simply compute local displacements. In addition, color coding reveals correspondences between analogous parts of outfit point clouds across the draping network outputs.

The draping network predicts not just the local displacements of each point from the point cloud of the input SMPL model, but significantly changes the position of the points so that the final predicted cloud resembles the geometry of the clothing. For example, the points that were originally in the hand of the 3D body model SMPL become points of the bottom of the clothing, that is, they flow from top to bottom, which is not a local change in their position and indicates the ability of the network to significantly transform the input cloud for reducing the loss function.

Figure 3:
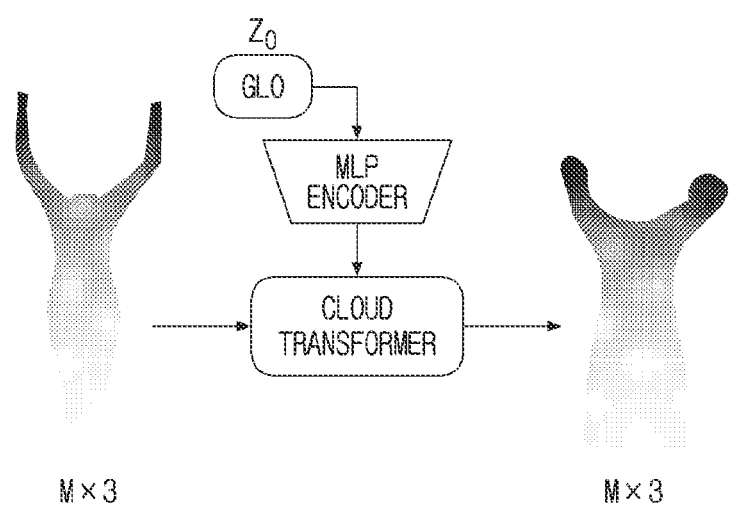
FIG. 3 illustrates draping network, that morphs the body point cloud (left) and the outfit code (top) into the outfit point cloud that is adapted to the body pose and the body shape.

FIG. 3 illustrates draping network, that morphs the body point cloud (left) and the outfit code (top) into the outfit point cloud that is adapted to the body pose and the body shape.

On the left and on the top there are two inputs of the draping network, which are the 3D point cloud (Mx3 in FIG. 3) sampled from the cut SMPL mesh and the d-dimensional outfit code vector (d=8 in proposed experiments) respectively. GLO stands for the Generative Latent Optimization technique used to learn the outfit code vectors. The outfit code vector (Z0 on the FIG. 3) is processed with an Multi-layer Perceptron neural network (encoder) and its output then passed to the Cloud Transformer neural network. The Cloud Transformer deforms the input point cloud given the output of the MLP neural network (encoder) and outputs the predicted 3D point cloud of an outfit.

To build a solid geometric prior on clothing, proposed draping function $G\theta$ is pre-trained on synthetic Cloth3D dataset.

It is split into train and validation parts, resulting in N=6475 training video sequences. Since most of the consequent frames share common pose/clothes geometry, only each 10-th frame is considered for the training. As described in Section Point cloud draping, they are randomly initialize $\{z1, \ldots, zN\}$, where $z_i \in Z \subseteq \mathbb{R}^d$ for each identity i in the dataset. In the experiments, set is the latent code dimensionality relatively low to d=8, in order to avoid overfitting during subsequent single-image shape fitting (as described in Section Point cloud draping).

The outfit codes zi are input to an MLP encoder consisting of 5 fully-connected layers to obtain a 512-dimensional latent representation. Then it is passed to the AdaIn branch of the Cloud Transformer network. As of pose and body information, an SMPL point cloud with hands, feet and head vertices removed is input (see FIG. 1). The draping network outputs three-dimensional point clouds with 8.192 points in all proposed experiments. Chose is approximate Earth Mover's Distance as the loss function and optimize each GLO-vector and the draping network simultaneously using a method for stochastic optimization.

While pre-training provides highly expressive priors on dresses and skirts, the diversity on tighter outfits may be somewhat limited, and this effect may be mainly caused by a high bias towards jumpsuits in the Cloth3D tight clothing categories.

Once the draping network is pretrained on a large synthetic dataset, the geometry of a previously unseen outfit may be modeled. The fitting can be done to a single or multiple images. For a single image, the outfit code z* is optimized to match the segmentation mask of the outfit in the image.

Figure 4:
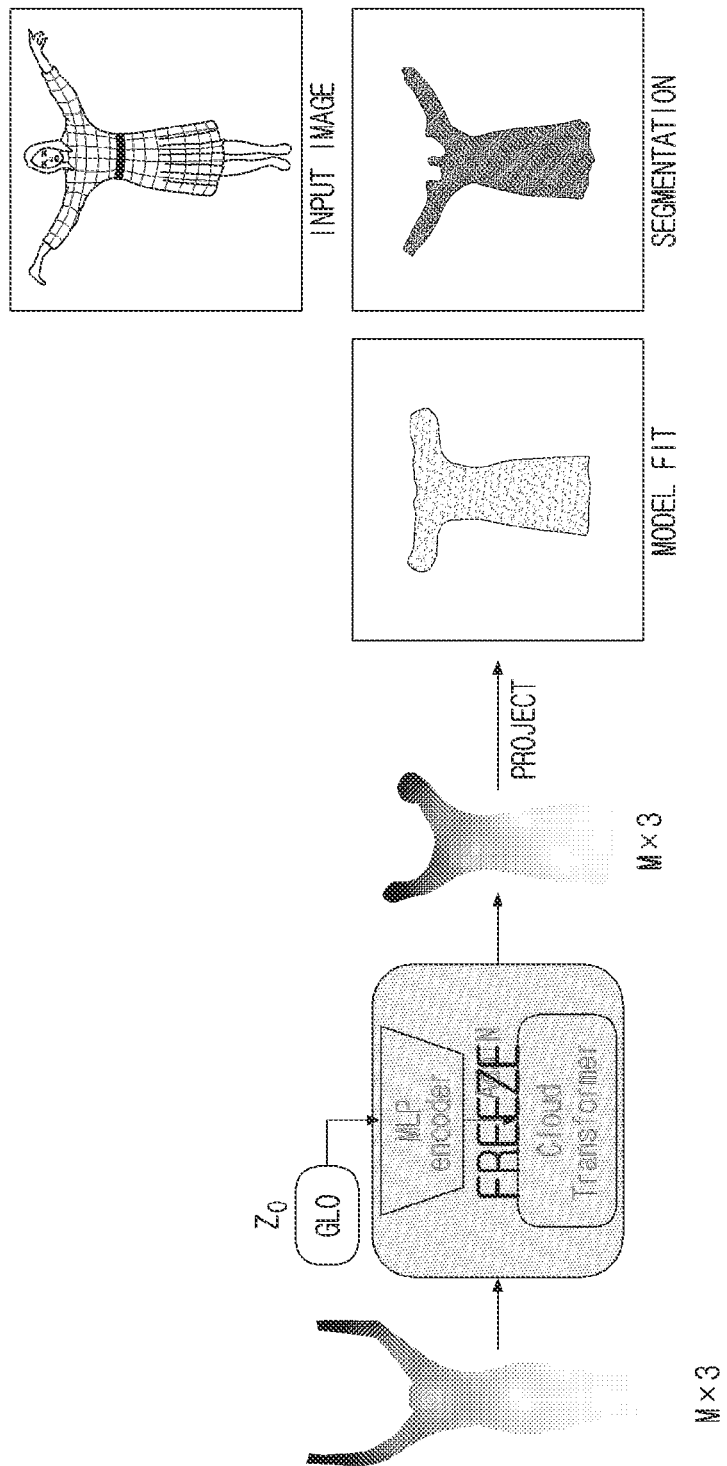
FIG. 4 illustrates the process of an outfit code estimation (optimization) given a single image of a person.

The process is illustrated on FIG. 4. In more detail, the binary outfit mask is predicted by passing given RGB image through Graphonomy network and combining all semantic masks that correspond to clothing (on the right side of the FIG. 4). The SMPL mesh is fit to the person in the image using the Simplify approach. Then the previously trained draping network generates a point cloud when some initial outfit code is input (on the top-left side of the FIG. 4). In addition, at the input to the draping network is some initial point cloud obtained from the cropped SMPL model (as indicated earlier in the text) for this image (on the left side of the FIG. 4). Next, the cloud of points of clothes, which was predicted by the draping network from this vector and this cloud of points, is projected onto a new black-and-white image with the camera parameters with which the true black-and-white mask of the clothes was obtained (in the middle of the FIG. 4). Next, these two black-and-white masks are compared by calculating the 2D chamfer loss function and the error propagates to the input outfit code, the values of which are changed so that the loss function produces values less and less. During optimization, the values of the outfit code, which is fed to the draping network input, change, while the rest of the system parameters are not changed. Freeze on the FIG. 4 indicates that the parameters of the draping network remain unchanged during the optimization process.

For complex outfits, instability in the optimization process may be observed, which often results in undesired local minima. To stabilize the fitting, several random initial values $\{z_0^*, \ldots z_T^*\}$ independently (in proposed experiments, T=4) are used.

After several optimization steps, $z_0^*$ the average outfit vector $$\bar{z} = \frac{1}{T}\sum_{t=1}^{T} z_t^*$$

and are considered, and then the optimization from $\bar{z}$ is continued until convergence, which may result in consistent accurate outfit codes.

100 training steps may be made while optimizing T hypothesis. After the averaging the optimization takes 50-400 steps depending on the complexity of the outfit's geometry.

Most applications of clothing modeling go beyond geometric modeling and require to model the appearance as well. Recently, it has been shown that point clouds provide good geometric scaffolds for neural rendering. The neural point-based graphics (NPBG) modeling approach may be used to add appearance modeling to proposed system.

Figure 5:
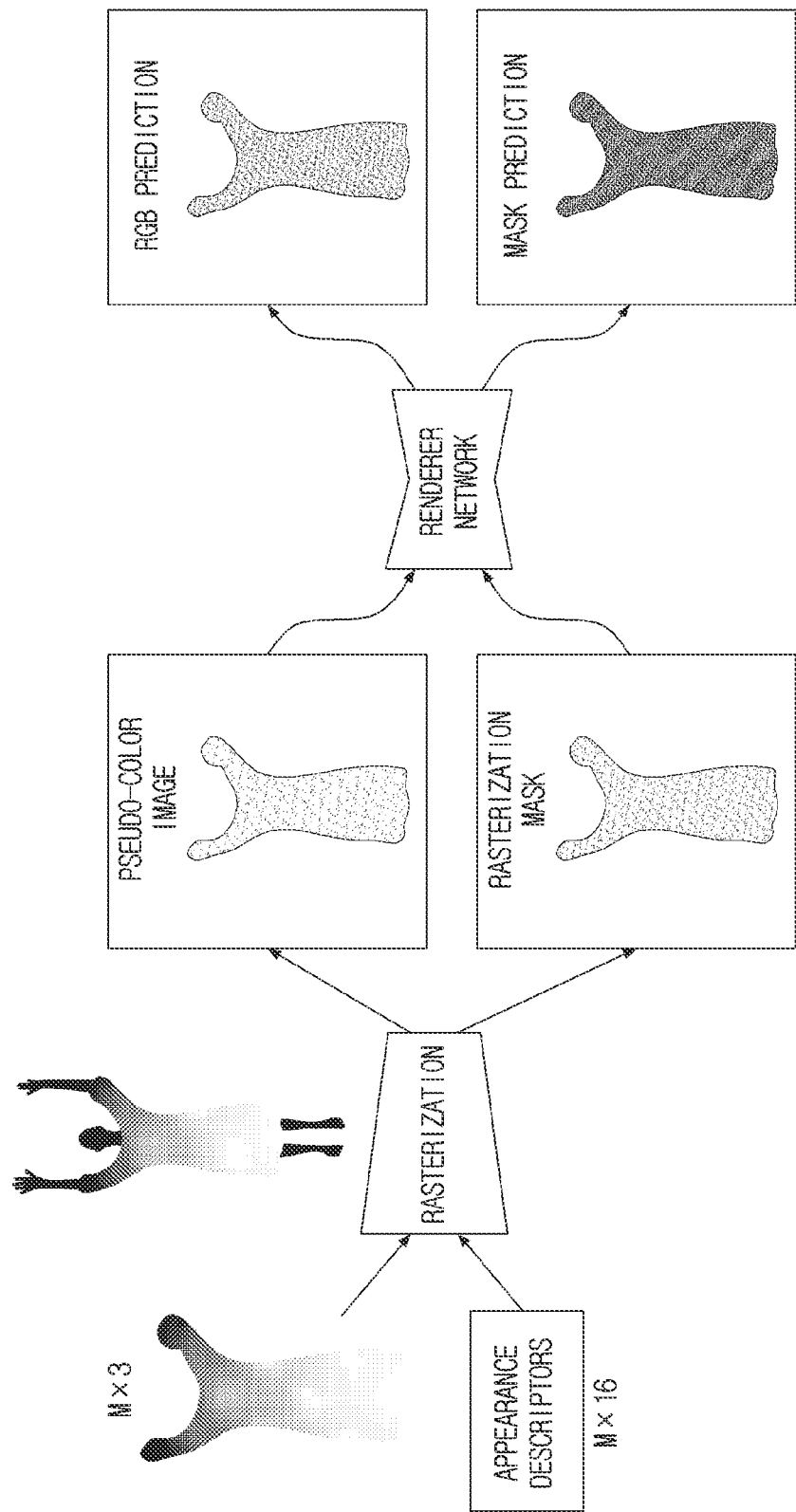
FIG. 5 illustrates using neural point-based graphics to model the appearance of an outfit.

FIG. 5 illustrates using neural point-based graphics to model the appearance of an outfit. The set of neural appearance descriptors and the renderer network that allow to translate the rasterization of the outfit point cloud (left) into its realistic masked image (right) may be learned.

In FIG. 5, starting from the left, there is the fixed 3D point cloud and a set of learnable neural descriptors, one 16-dimensional (n-dimensional) appearance descriptor vector is attached to each point of the point cloud. Then this point cloud with the attached learnable appearance descriptors is passed to the rasterization block, where the differentiable rasterizer takes into account the occlusion of the point cloud and the SMPL human body mesh and generates a 16-channeled image tensor with the use of 3D coordinates of each point and the neural descriptor of each point ("pseudo-color image" on FIG. 5). It also generates the binary black-white rasterization mask corresponding to the pixels of the image covered by the points. Next the 16-channeled image tensor is passed to the rendering network along with the binary black-white rasterization mask and the network predicts the final 3-channeled RGB-prediction image and the final outfit silhouette binary mask-prediction.

Thus, when modeling the appearance of a certain outfit with the outfit code z, p-dimensional latent appearance vectors T={t[1], . . . , t[M]} are attached to each of the M points in the point cloud that models its geometry. The rendering network $R_\psi$ with learnable parameters $\psi$ is also introduced. To obtain the realistic rendering of the outfit given the body pose s and the camera pose C, first the point cloud $G_\theta(z, s)$ is computed, and then the point cloud over the image grid of resolution W×H using the camera parameters and the neural descriptor t[m] as a pseudo-color of the m-th point is rasterized. The result of the rasterization is concatenated, which is a p-channeled image, with the rasterization masks, which indicates non-zero pixels, and then process (translate) them into the outfit RGB color image and the outfit mask (i.e. a proposed-channel image) using the rendering network $R_\psi$ with learnable parameters $\psi$.

During the rasterization, the SMPL mesh of the body is considered and the points occluded by the body are not rasterized. For the rendering network used is a lightweight U-net network.

Methods according to embodiments are directed to capturing the appearance of the outfit from video. Two-stage optimization may be performed. In first stage, the outfit code is optimized, minimizing the Chamfer loss between the point cloud projections and the segmentation masks, as described in the previous section. Then, latent appearance vectors T, and the parameters of the rendering network $\psi$ are jointly optimized. For the second stage the perceptual loss between the masked video frame and the RGB image rendered by proposed model, and the Dice loss between the segmentation mask and the rendering mask predicted by the rendering network are used.

Appearance optimization requires a video of a person with whole surface of their body visible in at least one frame. In experiments according to embodiments, training sequences consist of 600 to 2800 frames for each person. The whole process takes roughly 10 hours on NVIDIA Tesla P40 GPU.

After the optimization, the acquired outfit model can be rendered for arbitrarily posed SMPL body shapes, providing RGB images and segmentation masks.

The geometric modeling and the appearance modeling within proposed approach is evaluated and compared to related art. Both stages using two datasets of human videos are evaluated. The PeopleSnapsot contains 24 videos of people in diverse clothes rotating in A-pose. In terms of clothing, it lacks examples of people wearing skirts and thus does not reveal the full advantage of the method of an embodiment. Also evaluated is on a subset from AzurePeople dataset introduced. This subset contains videos of eight people in outfits of diverse complexity shot from 5.

Not only images of skirts are used, but the presence of such images shows the versatility of the proposed approach in terms of modeling various topologies of clothes. For example, a 3D model of pants and a 3D model of a skirt have different connectivity between vertices, and the advantage of the proposed system is that it can predict at least both of these topologies, which many other current approaches cannot (most of them do not reconstruct skirts at all. in any adequate form).

For both datasets generated are cloth segmentation masks with Graphonomy method and SMPL meshes using SMPLify. To run all approaches in comparison, also predicted are Openpose key points, DensePose UVI renders and SMPL-X meshes.

In addition to the evaluation dataset described above, also used is the Cloth3D dataset to train proposed geometric metamodel.

The Cloth3D dataset has 11.3K outfit elements of diverse geometry modeled as meshes draped over 8.5K SMPL bodies undergoing pose changes. The fitting uses physics-based simulation.

Each time the 3D geometry of the clothes is shown as a point cloud rendered over the SMPL model of the human body based on the method according to an embodiment, or a rendered 3D mesh of the whole body along with clothes based on methods according to related art. The lighting for rendering is the same and fixed, the color for all vertices of all 3D models is the same and fixed (gray).

Comparison of the following three methods include the Tex2Shape method that predicts offsets for vertices of SMPL mesh in texture space. It is ideally suited for the people Snapshot dataset, while less suitable to AzurePeople sequences with skirts and dresses.

The Multi-outfit net approach predicts clothing layered on top of SMPL body models. It proposes a virtual wardrobe of pre-fitted outfits, and is also able to fit new outfits from single image.

Proposed point-based approach predicts point cloud outfit geometry.

The compared systems use different formats to recover clothing (point cloud, vertex offsets, meshes). Furthermore, they are actually solving slightly different problems, as a method of an embodiment and Multi-outfit net recover clothing, while Tex2Shape recovers meshes that comprise clothing, body, and hair. All three systems, however, support retargeting to new poses. The relative performance of the three methods through a user study that assesses the realism of clothing retargeting is evaluated.

The users with triplets of images is presented, where the middle image shows the proposed photograph, while the side images show the results of two compared methods (in the form of shaded mesh renders for the same new pose). The result of such pairwise comparisons (user preferences) aggregated over _1.5 k user comparisons are shown in Table 1.

TABLE 1

|  | Ours v Tex2Shape | Ours v MGN | Ours v Octopus |
| --- | --- | --- | --- |
| PeopleSnapshot | 38.1% vs 61.9% | 50.9% vs 49.1% | 47.8% vs 52.2% |
| AzurePeople | 65.6% vs 34.3% | 74.5% vs 25.5% | 73.7% vs 26.3% |

In this series of experiments according to embodiments, the ability of the method to recover the outfit geometry from a single photograph is evaluated.

The method according to an embodiment reconstructs the 3D geometry of clothes from one photo. In an example of one specific picture, clothes from one picture are reconstructed by the proposed system and systems with which the method of an embodiment is compared. Next, the reconstructed 3D models of clothes are placed in a pose that is assumed that these systems have not previously been seen during training. The pose itself is chosen randomly from our separate set of poses previously derived from photographs of people in different poses. These images themselves, from which the poses are taken, are not shown anywhere else but only the pose from them is used.

What the assessor may view when assessing the quality are three objects in one picture including in the center of the picture is an image of a person in clothes that needs to be reconstructed, on one side of him (left or right) 3D geometry of the clothes, reconstructed by our method in a new pose, on the other side of it (to the left or to the right) 3D geometry of the outfit, reconstructed by another method in the same new pose.

The first row of Table 1 shows the results of the user study on the PeopleSnapshot dataset. The second row of the table shows the results on the AzurePeople dataset. The first column stands for the comparison of the outfit geometry predicted by the method according to an embodiment and the Tex2Shape approach, the second column stands for the comparison of the outfit geometry predicted by the method according to an embodiment and the MGN approach, the third column stands for the comparison of the outfit geometry predicted by the method according to an embodiment and the Octopus approach. In each cell of the table, the first number (before "vs") is the proportion of users who preferred the predicted outfit geometry of the method according to an embodiment, and the second number (after "vs") is the proportion of users who preferred the predicted outfit geometry of the method written in the corresponding column. In Table 1 which shows the results of user study, the users compared the quality of 3D clothing geometry recovery (fitted to a single image). The method according to an embodiment is preferred on the AzurePeople dataset with looser clothing, while the previous methods work better for tighter clothing of fixed topology.

Figure 6:
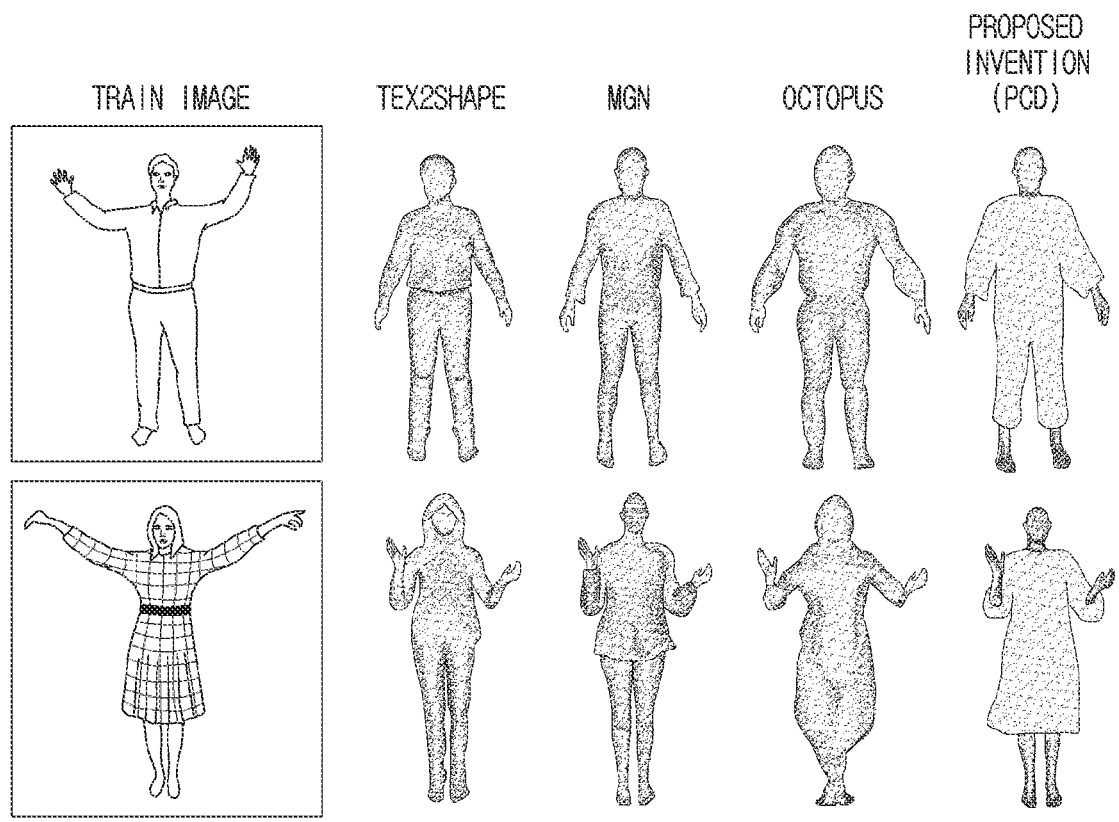
FIG. 6 illustrates the predicted geometries in the validation poses fitted to a single frame (left)

The method according to an embodiment is strongly preferred by the users in the case of AzurePeople dataset that contains skirts and dresses, while Tex2Shape and MGN are preferred on PeopleSnapshot dataset that has tighter clothing with fixed topology. FIG. 6 shows typical cases, while the supplementary material provides more extensive qualitative comparisons. In user study proposed points are pointed in gray to exclude the coloring factor in user's choice. FIG. 6 illustrates the predicted geometries in the validation poses fitted to a single frame (train image in the left). In more detail, the first column (train image) shows an image (one row—single image) that the system according to an embodiment was trained on. The task is to reconstruct the 3D geometry of clothing from the image as precisely as possible. Each of the next columns represents the results of adapting the learned outfit geometry to a new, previously unseen, pose by each corresponding method including Tex2Shape system in the second column, Multi-outfit Net (MGN) approach in the third column, Octopus method in the proposed column. The last column shows the results of the adaptation to the new pose of the outfit geometry predicted by proposed system. For the method (right) the geometry is defined by a point cloud, while for Tex2Shape and Multi-outfit Net (MGN) the outputs are mesh based. The method according to an embodiment is able to reconstruct the dress, while other methods are not capable of reconstructing the dress (bottom row). The method according to an embodiment is able to reconstruct a tighter outfit too (top row), though Tex2Shape with its displacement based approach achieves a better result in this case. For completeness, in the supplementary material, provided is additional comparisons of the method with the Octopus system, which is not ideally suited for reconstruction based on a single photograph.

Proposed appearance modeling pipeline is evaluated against the StylePeople system (the multi frame variant) that is the closest to methods according to embodiments in many ways. StylePeople fits a neural texture of the SMPL-X mesh alongside the rendering network using a video of a person using backpropagation.

For comparison StylePeople is modified to generate clothing masks along with rgb images and foreground segmentations. Both approaches are trained separately on each person from AzurePeople and PeopleSnapshot dataset.

Then compared are outfit images generated for holdout views in terms of three metrics that measure visual similarity to ground truth images, namely learned perceptual similarity (LPIPS) distance, structural similarity (SSIM) and its multiscale version (MS-SSIM).

Figure 8:
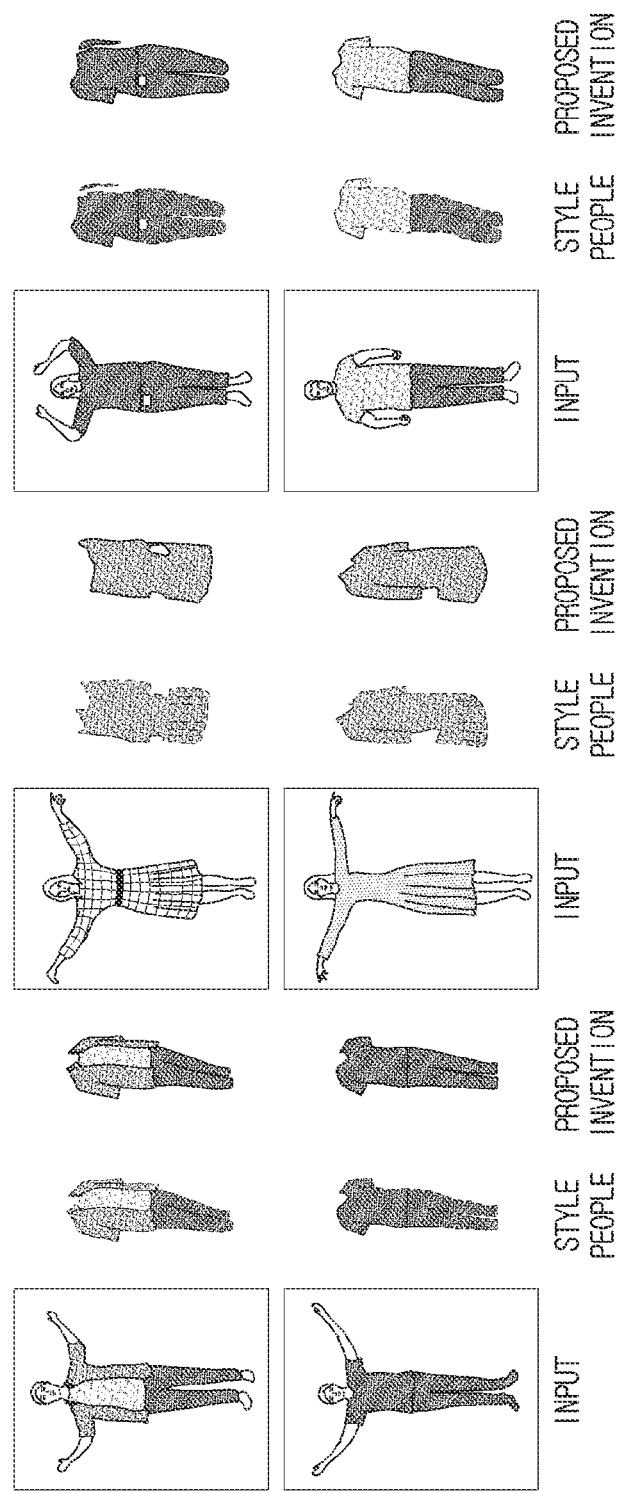
FIG. 8 illustrates compare the appearance retargeting results of method of an embodiment to new poses unseen during fitting between the method and the StylePeople system (multi-shot variant), which uses the SMPL mesh as the underlying geometry and relies on neural rendering alone to grow loose clothes it renders.

The results of the comparison are shown in Table 2, while qualitative comparison is shown in FIG. 8.

TABLE 2

|  | LPIPS↓ | SSIM↑ | MS-SSIM↑ |
| --- | --- | --- | --- |
|  | PeopleSnapshot | | |
| Ours | 0.031 | 0.950 | 0.976 |
| StylePeople | 0.0569 | 0.938 | 0.972 |
|  | AzurePeople | | |
| Ours | 0.066 | 0.925 | 0.937 |
| StylePeople | 0.0693 | 0.923 | 0.946 |

Table 2 shows quantitative comparisons with the StylePeople system on the two test datasets using common image metrics. The method according to an embodiment outperforms StylePeople in most metrics thanks to more accurate geometry modeling within proposed approach. Here, the upper section of the table stands for the evaluation on the PeopleSnapshot dataset, the bottom section of the table stands for the results on the AzurePeople dataset. The first row in each section stands for the method according to an embodiment, the second row stands for the StylePeople approach. In the first column are the values of the learned perceptual similarity (LPIPS) distance. In the second column are the values of the structural similarity (SSIM) metric. In the third column are the values of the multiscale version of SSIM (MS-SSIM). All these metrics are calculated on the predictions of the method according to an embodiment and on the predictions of the StylePeople approach and averaged over the corresponding dataset. The results shown in this table establish that the method according to an embodiment outperforms the StylePeople approach on both datasets according to all metrics, except the case of MS-SSIM metric on AzurePeople dataset, which may be due to the use of more complex renderer network compared to the one in proposed approach (it is more lightweight in Proposed). This advantage is validated by visual inspection of quantitative results (FIG. 8).

Figure 7:
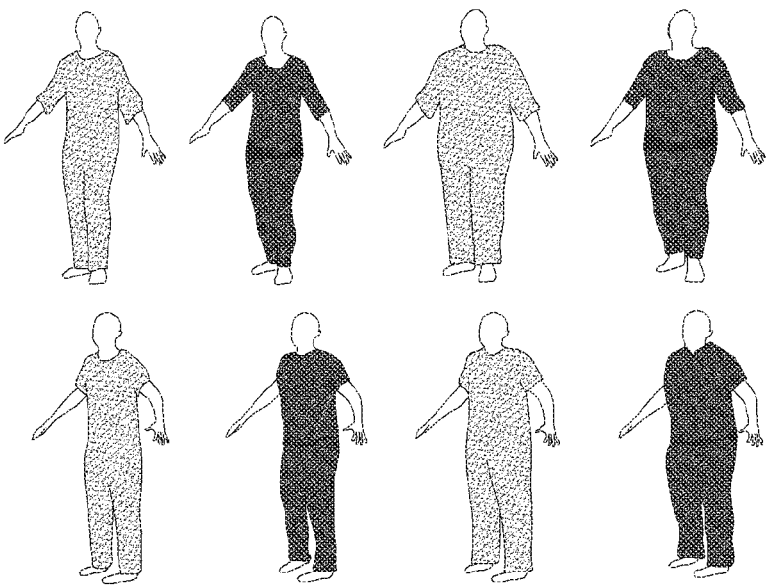
FIG. 7 illustrates that the embodiment re-targeting the geometry and the appearance to new body shapes.

In FIG. 1, additional results of the methods according to embodiments are illustrated. A number of clothing outfits of varying topology and type retargeted to new poses from both test datasets are illustrated. Finally, in FIG. 7, illustrated are examples of retargeting of outfit geometry and appearance to new body shapes within the method according to an embodiment. In more detail, the first row and the first column is an outfit geometry learned from a single photo of the first subject from the PeopleSnapshot dataset, in the second column is the appearance learned from the video of this subject. The next two columns in the first row shows the example of an adaptation of these learned geometry and appearance to the new, previously unseen, human body shape. The same information is depicted in the second row, but for another subject from the PeopleSnapshot dataset.

FIG. 7 illustrates the method according to an embodiment can also retarget the geometry and the appearance to new body shapes. The appearance retargeting works well for uniformly colored clothes, though detailed prints (e.g. chest region in the bottom row) can get distorted.

FIG. 8 illustrates comparing the appearance retargeting results of method according to an embodiment to new poses unseen during fitting between the method and the StylePeople system (multi-shot variant), which uses the SMPL mesh as the underlying geometry and relies on neural rendering alone to grow loose clothes in renders. In more detail, 6 subjects were picked from the AzurePeople dataset with their corresponding video sequences from 4 cameras. In addition, for each of these subjects, the single photograph was chosen randomly from their video sequences (columns 1, 4, and 7). For each of these photographs, the outfit geometry was learned following outfit code estimation technique described previously in the text. Then, the appearance for each subject given their outfit geometries and the videos from 4 cameras are learned and the appearance for a new holdout camera view and in a new holdout body pose are predicted. The results of proposed approach are in columns 3, 6, and 9. Then the StylePeople approach was also fed with just the same video sequences of these subjects, its prediction on the same new camera view and in the same new holdout body pose are depicted in columns 2, 5, and 8. The proposed system produces sharper results for looser clothes due to the use of more accurate geometric scaffolding.

Embodiments are directed to human clothing modeling based on point clouds. Embodiments provide a generative model for outfits of various shape and topology that allows us to capture the geometry of previously unseen outfits and to retarget it to new poses and body shapes. The topology-free property of proposed geometric representation (point clouds) is particularly suitable for modeling clothing due to wide variability of shapes and composition of outfits in real life. In addition to geometric modeling, used is the ideas of neural point-based graphics to capture clothing appearance, and to re-render full outfit models (geometry+appearance) in new poses on new bodies.

Embodiments are directed to appearance modeling requires a video sequence in order to capture outfit appearance, which can be potentially addressed by expanding the generative modeling to the neural descriptors in a way similar to generative neural texture model.

A system according to an embodiment for modeling outfit on a person and outfit fitting, using the method, can comprise a detecting device connected to a computer system. The detecting device can be a simple video/photo camera. Computer system may comprise an operating unit connected to a screen and selection unit. The operating unit is a part of the computer system, which implements the method. The computer system can be one of, for example, computer, laptop, smartphone and any other suitable electronic device, screen can be display of the computer, laptop, smartphone and any other suitable display. The selection unit is interface in which user can choose videos and images with favorite outfit for fitting.

The detecting device capture a color video stream of real person, for example user, in real time, the video is imaged in the screen in real time. The person may choose, by selection unit, any desirable outfit according to any video of a human in outfit. The images of person and images choosing by the person are processed by operating unit. As result, the person may see himself, possibly in real time, in the chosen outfit.

The foregoing embodiments are examples and are not to be construed as limiting. In addition, the description of the embodiments is intended to be illustrative, and not to limit the scope of the claims, and many alternatives, modifications, and variations will be apparent to those skilled in the art.

What is claimed is:

1. A method for training a draping network for modeling an outfit on a person, the outfit corresponding to a body pose and a body shape of a person, the method comprises:
   providing a set of frames of persons, each person wearing an outfit and the frames being video sequences in which each person makes movements;
   obtaining for each frame among the frames Skinned Multi-Person Linear (SMPL) meshes corresponding to a pose and a shape of a body of a person included in the frame;
   obtaining, for each frame among the frames, outfit mesh corresponding to the pose and the shape of the body of the person included in the frame;
   generating initial point clouds as a set of vertices of the SMPL meshes for each frame;
   setting randomly initialized d-dimensional code vector corresponding to outfit style encoding for each person;
   inputting the initial point clouds in a Cloud Transformer neural network of athe draping network and inputting the outfit code vectors in a Multi-Layer Perceptron (MLP) neural network encoder;
   processing the outfit code vectors with an MLP encoder neural network and passing the output of the MLP encoder neural network to the Cloud Transformer neural network, to deform the initial point clouds providing the output of the MLP encoder neural network and output the predicted point cloud of the outfit for each frame;
   obtaining, after processing all frames from the set of frames of persons, pre-trained draping network including weights of the trained MLP encoder neural network, weights of the trained Cloud Transformer neural network, outfit code vectors of encoding styles of all persons; and
   inputting, by pre-trained draping network, appropriate style of outfit, corresponding one of the vectors and one of the point clouds, on a body shape and a body pose of a user.

2. A method for obtaining predicted point cloud of outfit and an outfit code vector from an image of a material person in outfit for modeling the outfit on a person, the outfit being adapted to a body pose and a body shape of a person, the method comprises:
   obtaining, by detecting device, the image of the material person in the outfit;
   predicting Skinned Multi-Person Linear (SMPL) mesh in the desired pose and body shape from the image by the SMPLify method;
   generating an initial point cloud as a vertice of the SMPL mesh for the image;
   predicting a binary outfit mask corresponding pixels of the outfit in the image by a segmentation network;
   initializing, with random values, d-dimensional outfit code vector for outfit style encoding for the image;
   inputting the initial point cloud and the outfit code vector into a pre-trained draping network;
   obtaining a predicted point cloud of the outfit from the pre-trained draping network output;
   projecting the outfit point cloud to a black-and-white image with camera parameters of the image of the person;
   comparing, by obtaining a loss function, a projection of the predicted point cloud on the image with a ground truth binary outfit mask corresponding the pixels of the outfit in the image via a chamfer distance between a two-dimensional (2D) point clouds, which are projections of three-dimensional (3D) point clouds;
   optimizing the outfit code vector based on the obtained loss function; and
   inputting, by the obtained outfit code vector, predicted point cloud of the outfit of the image on any body shape and any body pose of a user.

3. The method of claim 2, training of the pre-trained network comprising:
   providing a set of frames of persons, each person wearing an outfit and the frames being video sequences in which each person makes movements;
   obtaining for each frame among the frames Skinned Multi-Person Linear (SMPL) meshes corresponding to a pose and a shape of a body of a person included in the frame;
   obtaining, for each frame among the frames, outfit mesh corresponding to the pose and the shape of the body of the person included in the frame;
   generating an initial point cloud as a set of vertices of the SMPL meshes for each frame;
   setting randomly initialized d-dimensional code vector corresponding to outfit style encoding for each person;

inputting the initial point cloud in a Cloud Transformer neural network of a draping network and inputting the outfit code vectors in a Multi-Layer Perceptron (MLP) neural network encoder;

processing the outfit code vector with an MLP encoder neural network and passing the output of the MLP encoder neural network to the Cloud Transformer neural network, to deform the initial point cloud providing the output of the MLP encoder neural network and output the predicted point cloud of the outfit for each frame;

obtaining, after processing all frames from the set of frames of persons, pre-trained draping network including weights of the trained MLP encoder neural network, weights of the trained Cloud Transformer neural network, outfit code vectors of encoding styles of all persons; and inputting, by pre-trained draping network, appropriate style of outfit, corresponding one of the vectors and one of the point clouds, on a body shape and a body pose of the user.

4. A method for modeling outfit on a person, the outfit being adapted to a body pose and a body shape of any person, the method comprises:

providing a color video stream of a first person;

choosing, by a user, an outfit corresponding to a video of a second person in an outfit;

obtaining a predicted point cloud of outfit and an outfit code vector according to a method for any of frame included in the video;

initializing, with random values, n-dimensional appearance descriptor vector corresponding to each point of the point cloud;

generating, by rasterization block, a 16-channeled image tensor with the use of the 3D coordinates of each point and a neural descriptor of each point, and a binary black-white mask corresponding to the pixels of an image covered by the points;

processing, by a rendering network, the 16-channeled image tensor along with the binary black-white mask for obtaining outfit red-green-blue (RGB) color image and an outfit mask;

optimizing rendering network weights and appearance descriptors values based on a ground truth video-sequence of a person to obtain the desired outfit appearance;

imaging to the user, by a screen, video of the first person in the outfit of second person, by the predicted rendered outfitting image given body pose and body shape, wherein the user is inputs videos of a person and views the learned colored outfitting model retargeted to new body shapes and new body poses, rendered on top of a new video to dress the person from a video in an outfit chosen by the user.

5. The method of claim 4, further comprising imaging, to the user, colored outfitting model over the user, the user being a real person.

6. The method of claim 4, wherein the method of obtaining a predicted point cloud of outfit and an outfit code vector for any of frame included in the video comprises:

obtaining, by detecting device, an image of a material person in outfit;

predicting Skinned Multi-Person Linear (SMPL) mesh in the desired pose and body shape from the image by the SMPLify method;

generating an initial point cloud as a vertice of the SMPL mesh for the image;

predicting a binary outfit mask corresponding the pixels of the outfit in the image by a segmentation network;

initializing, with random values, d-dimensional outfit code vector for outfit style encoding for the image;

inputting the initial point cloud and the outfit code vector into a pre-trained draping network, obtaining a predicted point cloud of the outfit from the pre-trained draping network output;

projecting the outfit point cloud to a black-and-white image with camera parameters of the image of the person;

comparing, by obtaining a loss function, a projection of the predicted point cloud on the image with a ground truth binary outfit mask corresponding the pixels of the outfit in the image via a chamfer distance between a two-dimensional (2D) point clouds, which are projections of three-dimensional (3D) point clouds;

optimizing the outfit code vector based on the obtained loss function; and inputting, by the obtained outfit code vector, predicted point cloud of the outfit of the image on any body shape and any body pose of the user.

7. A system for modeling outfit on a person, comprising:

a detecting device connected to a computer system comprising a processor configured to be implemented as an operating unit connected to a display screen and a selection interface, wherein the detecting device is configured to obtain a color video stream of first person in real time, wherein the selection interface being configured to receive an input by a user choosing an outfit based on a video of a second person in the outfit, wherein the display screen is configured to display the first person in real time in the outfit selected by the user from the video based on data received from the operation unit, and wherein a draping network for modeling the outfit on the person based on a body pose and a body shape of the person is trained by:

providing a set of frames of persons, each person wearing an outfit and the frames being video sequences in which each person makes movements;

obtaining for each frame among the frames Skinned Multi-Person Linear (SMPL) meshes corresponding to a pose and a shape of a body of a person included in the frame;

obtaining, for each frame among the frames, outfit mesh corresponding to the pose and the shape of the body of the person included in the frame;

generating initial point clouds as a set of vertices of the SMPL meshes for each frame;

inputting the initial point cloud in a Cloud Transformer neural network of the draping network and inputting the outfit code vectors in a Multi-Layer Perceptron (MLP) neural network encoder; and processing the outfit code vectors with an MLP encoder neural network and passing the output of the MLP encoder neural network to the Cloud Transformer neural network, to deform the initial point cloud providing the output of the MLP encoder neural network and output the predicted point cloud of the outfit for each frame.

8. The system of claim 7, wherein the user is the first person.

* * * * *